United States Patent
Lee et al.

(10) Patent No.: US 8,687,139 B2
(45) Date of Patent: Apr. 1, 2014

(54) LIQUID CRYSTAL DISPLAY DEVICE HAVING REDUCED STATIC ELECTRICITY

(75) Inventors: Min Gyu Lee, Paju-si (KR); Jin Man Bae, Incheon (KR)

(73) Assignee: LG Display Co., Ltd., Seoul (KR)

( * ) Notice: Subject to any disclaimer, the term of this patent is extended or adjusted under 35 U.S.C. 154(b) by 1148 days.

(21) Appl. No.: 12/654,041

(22) Filed: Dec. 8, 2009

(65) Prior Publication Data

US 2010/0149453 A1 Jun. 17, 2010

(30) Foreign Application Priority Data

Dec. 15, 2008 (KR) .................. 10-2008-0127186

(51) Int. Cl.
*G02F 1/1333* (2006.01)
*G02F 1/1335* (2006.01)

(52) U.S. Cl.
USPC .................. 349/58; 349/61; 349/62; 349/63; 349/64

(58) Field of Classification Search
USPC .............................................. 349/58, 61–64
See application file for complete search history.

(56) References Cited

U.S. PATENT DOCUMENTS

| 6,987,323 B2 | 1/2006 | Yamane |
| 8,456,584 B2 * | 6/2013 | Koo ................................ 349/40 |
| 2005/0110916 A1 | 5/2005 | Park et al. |
| 2010/0277663 A1 * | 11/2010 | Koo ................................ 349/58 |
| 2012/0206682 A1 * | 8/2012 | Onishi et al. ................... 349/138 |

FOREIGN PATENT DOCUMENTS

| CN | 1619366 | 5/2005 |
| JP | 2008-172015 A | 7/2008 |
| KR | 10-2005-0064521 A | 6/2005 |
| KR | 10-2008-0047936 | 5/2008 |
| KR | 10-2010-0066239 A | 6/2010 |

* cited by examiner

*Primary Examiner* — Huyen Ngo
(74) *Attorney, Agent, or Firm* — McKenna Long & Aldridge, LLP

(57) ABSTRACT

An LCD device adapted to prevent a malfunction due to static electricity is disclosed. The LCD device includes: a liquid crystal display panel; a panel guider configured to support edges of the liquid crystal display panel; a bottom cover combined with the panel guider; and at least one conductive tape attached to the liquid crystal display panel and the bottom cover, and configured to include: a plurality of slit trains formed in a pattern, that positions of slits in one of the slit trains are shifted from those in adjacent slit trains along a first direction.

24 Claims, 4 Drawing Sheets

LIQUID CRYSTAL DISPLAY DEVICE HAVING REDUCED STATIC ELECTRICITY

This application claims priority to Korea Patent Application No. 10-2008-0127186, filed on Dec. 15, 2008, which is hereby incorporated by reference in its entirety for all purposes.

BACKGROUND

1. Field of the Disclosure

This disclosure relates to a liquid crystal display (LCD) device adapted to prevent a malfunction due to static electricity.

2. Description of the Related Art

Cathode ray tubes (CRTs), which are widely used display devices, are mainly used as TVs or monitors for measuring apparatuses or information terminals. However, the heavy weight and large size of the CRTs have been a major hindrance to manufacturing of small, light electronic products.

To address this matter, LCD devices are gradually being used in a wide range of applications due to advantages such as lightness, thinness, and low power consumption driving. Accordingly, LCD devices are being manufactured to have larger screens, to be thinner, and to consume less power. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing the light necessary to display an image. The LCD panel is structurally supported by a panel guider combined with a bottom cover of the backlight unit.

In an LCD device having such a structure, static electricity can be caused by movement or friction. Static electricity refers to electric charges charged by friction, movement, etc. Static electricity emits energy upon discharge and changes into a state of low energy.

When static electricity is discharged, the discharging voltage is high enough to impulse electric appliances. In the case of LCD devices, fine patterns and thin film transistors are formed on the LCD panel. As such, the discharge of static electricity may force wiring to be broken or short-circuited and the thin film transistors to be damaged, causing the LCD device to malfunction. In addition, the broken or short-circuited wiring and the damaged thin film transistors deteriorate the display quality of the LCD panel.

BRIEF SUMMARY

Accordingly, the present embodiments are directed to an LCD device that substantially obviates one or more of problems due to the limitations and disadvantages of the related art.

An object of the present embodiment is to provide an LCD device adapted to prevent a malfunction due to static electricity.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal display panel; a panel guider configured to support edges of the liquid crystal display panel; a bottom cover combined with the panel guider; and at least one conductive tape attached to the liquid crystal display panel and the bottom cover, and configured to include: a plurality of slit trains formed in a pattern, that positions of slits in one of the slit trains are shifted from those in adjacent slit trains along a first direction, along the first direction.

According to another general aspect of the present embodiment, a conductive tape used in an electronic device generating static electricity, the electronic device having a conductive portion, the conductive tape being attached to the conductive portion to discharge the static electricity and including: a plurality of slit trains formed in a pattern, that positions of slits in one of the slit trains are shifted from those in adjacent slit trains along a first direction, along the first direction.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
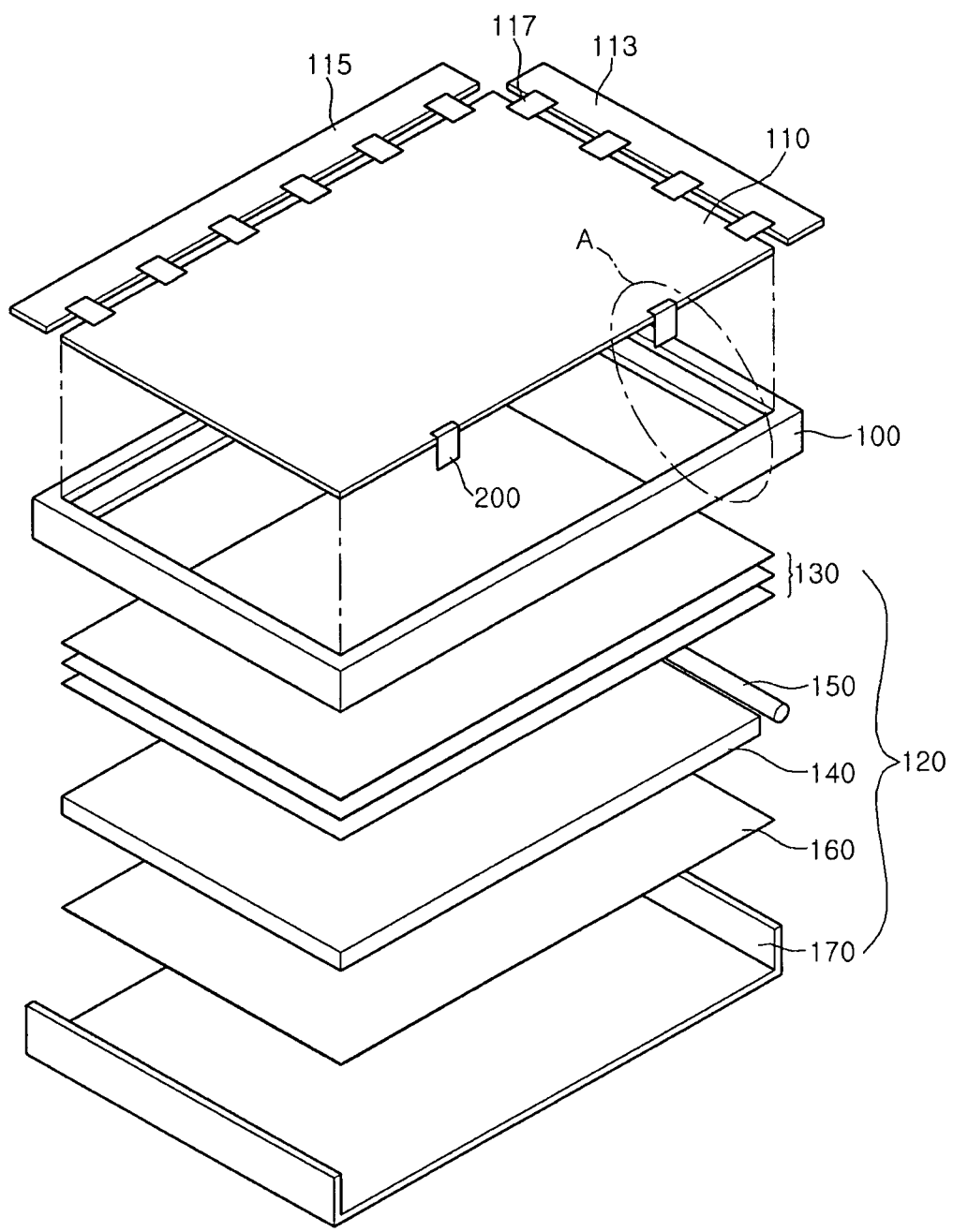
FIG. 1 is an exploded perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is an exploded perspective view showing an LCD device according to an embodiment of the present disclosure.

Figure 2A:
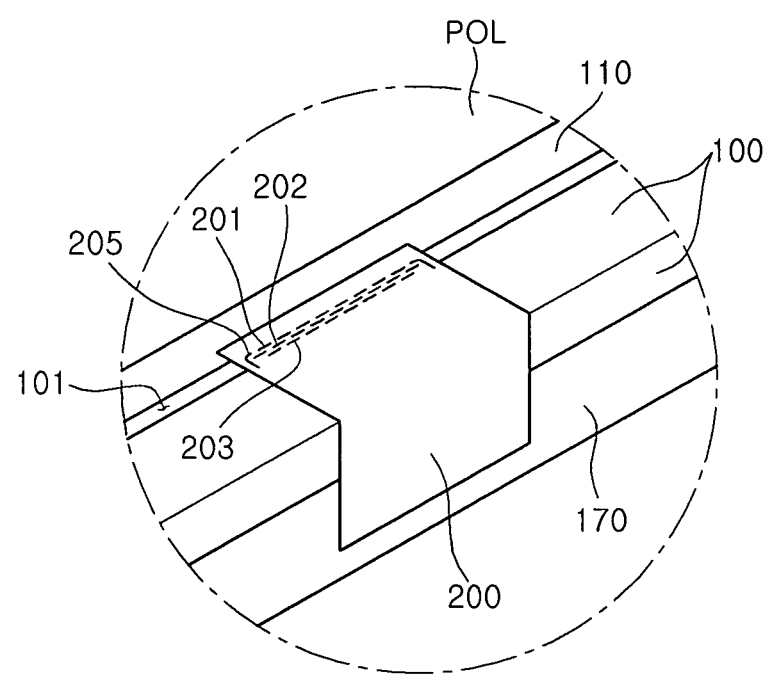
FIG. 2A is an enlarged perspective view showing the conductive tape used in a normal-bezel type panel and the peripheral region thereof which correspond to the portion A shown in FIG. 1.
Figure 2B:
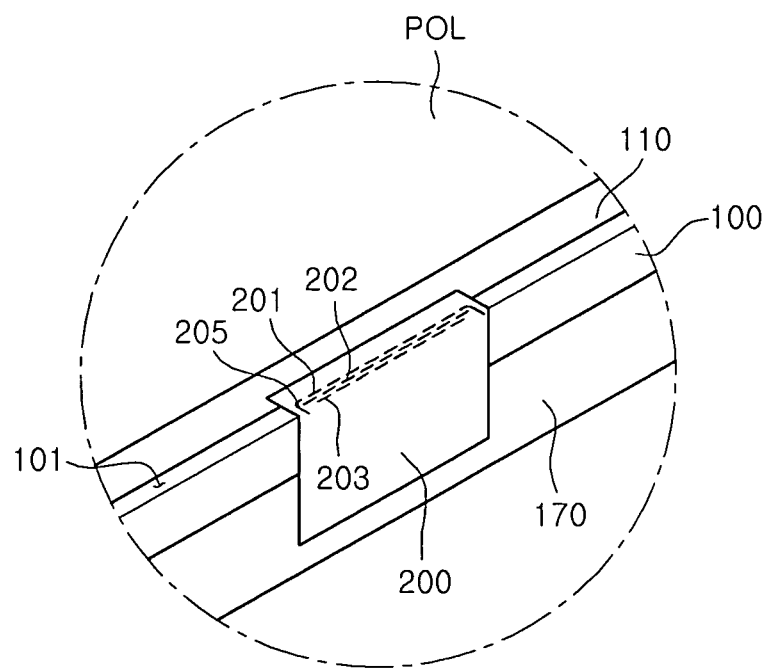
FIG. 2B is an enlarged perspective view showing the conductive tape used in a narrow-bezel type panel and the peripheral region thereof which correspond to the portion A shown in FIG. 1.

FIG. 2A-2B are enlarged perspective views showing the conductive tape and the peripheral region thereof which correspond to the portion "A" shown in FIG. 1.

Referring to FIGS. 1 and 2A, 2B, an LCD device according to an embodiment of the present disclosure includes an LCD panel 110 for displaying an image, a backlight unit 120 disposed on the rear surface of the LCD panel 110 and providing light to the LCD panel 110, and a panel guider 100 combined with the backlight unit 120 and supporting the rear surface edge of the LCD panel 110. The LCD device further includes a top case not shown in the drawings. The top case encompasses the upper surface edge of the LCD panel 110 and is fixed to the backlight unit 120.

Although it is not shown in detail in the drawings, the LCD panel 110 includes a thin film transistor (TFT) array substrate and a color filter substrate which are combined together to face each other and maintain a uniform cell gap therebetween, as well as a liquid crystal layer interposed between the substrates. The TFT array substrate includes a plurality of gate lines formed on it, a plurality of data lines formed crossing the plural gate lines, and a TFT formed at each intersection of the gate and data lines.

A gate driver printed-circuit-board (PCB) 113 is provided on one edge of the LCD panel 110 and a data driver PCB 115 is provided on another edge of the LCD panel 110. The gate driver PCB 113 applies a scan signal to the gate lines. The data driver PCB 115 applies data signals to the data lines. In this case, the gate driver PCB 113 and the data driver PCB 115 are electrically connected to the LCD panel 110 by means of several chip-on-films (COFs) 117. The COFs 117 can be replaced by tape carrier packages (TCPs).

The backlight unit 120 includes a bottom cover 170 opened upward, at least one light source 150 (besides the light source 150 shown in FIG. 1, any types of backlight source may be adapted), a light guide plate 140 disposed parallel to the light source 150 and configured to convert light incident from the light source 150 into two-dimensional light, optical sheets 130 disposed on the light guide plate 140 and configured to converge and diffuse light, and a reflective sheet 160 disposed under the light guide plate 140. The reflective sheet 160 reflects light progressing downwardly from the light sources toward the LCD panel 110 and reduces light loss. The backlight unit 120 further includes a support main (not shown) placed into the bottom cover 170. The support main houses the light source 150, the light guide plate 140, and the optical sheets 130.

The light guide plate 140 is formed of poly methyl methacrylate (PMMA). Also, the light guide plate 140 has a wedge shape which becomes thinner the further away it is from the light source 150. A prism pattern can be formed on the rear surface of the light guide plate 140. The prism pattern refracts incident light toward the optical sheets 130.

The optical sheets 130 include a diffusion sheet for diffusing light, a convergent sheet for converging light, and a protective sheet for protecting the diffusion sheet and the convergent sheet.

The light source 150 can include a lamp or a plurality of light emission diodes (LEDs) which are dot light sources. The light source 150 can further include a guider configured to guide the light emitted from the lamp or the plural LEDs toward the light guide plate 140. The guider may be disposed to encompass the lamp or the plural LEDs.

The bottom cover 170 is formed of a metal material. Although it is not shown in the drawings, a control PCB is disposed on the underside of the bottom cover 170.

A plurality of conductive tapes 200 are disposed on one edge portion of the upper surface of the LCD panel 110 for eliminating static electricity induced in the LCD panel 110. More specifically, the conductive tapes 200 are attached on one edge portion of the color filter substrate or the thin film transistor substrate of the LCD panel 110, not on one of polarizing films POL which are disposed on both the upper and the rear surfaces of the LCD panel 110.

Each of the conductive tapes 200 is formed in a rectangular pad shape having a long side and a short side. The conductive tapes 200 each include one edge attached on the LCD panel 110 and another edge attached on the bottom cover 170, preferably, on the side or on the rear surface of the bottom cover 170. To this end, each of the conductive tapes 200 bends from the edge portion of the LCD panel toward the side surface of the panel guider 100, and optionally, from the side surface of the panel guider 100 toward the rear surface of the bottom cover 170. Also, an adhesive is coated on one surface of each conductive tape 200, even though it is not shown in the drawings.

In order to eliminate static electricity caused by friction and so on during the process of manufacturing an LCD device, the conductive tapes 200 electrically connect the LCD panel 110 to the bottom cover 170 of a metal material. In other words, the conductive tapes 200 bypass static electricity generated in the LCD panel 110 toward the bottom cover 170 and prevent the discharging of static electricity within the LCD panel 110.

In this manner, the LCD device of the present embodiment is explained in such a configuration that the conductive tapes 200 electrically connect the LCD panel 110 with the bottom cover 170, but it is not limited to this. For example, the LCD device of the present embodiment can further include another configuration which electrically connects the LCD panel 110 with a top case (not shown) encompassing the edge of the LCD panel 110.

The LCD panel 110 can move from (or within) the panel guider 100 by a vibration/shake and so on. The movement of the LCD panel 110 forces stresses to convergently occur in a specific portion of the conductive tapes 200. The stress-converged portion of the conductive tapes 200 may be in a region between the LCD panel 110 and the side surface of the panel guider 100. On the stress-converged portion of the conductive tapes 200, first to third slit trains 201, 202, and 203 are formed at a fixed interval.

If the conductive tape 200 are applied to the LCD device of a normal bezel model as shown in FIG. 2A, the stress-converged portion may correspond to a separable region 101, which can be generated by the movement of the LCD panel 110, between the panel guider 100 and the LCD panel 110. As such, the first to third slit trains 201, 202, and 203 are formed on a portion of the conductive tape 200 opposite to the separable region of the LCD device of the normal bezel model. Such an LCD device of the normal bezel model has a configuration in which the conductive tapes 200 are attached to one edge of the LCD panel 110 and the upper and side surfaces of the panel guider 100. The conductive tapes 200 are also attached to one side surface of the bottom cover 170.

Also, the conductive tape 200 can be applied to the LCD device of a narrow bezel model as shown in FIG. 2B. The LCD device of the narrow bezel model has a configuration in which the conductive tapes 200 are attached to one edge of the LCD panel 110 and the side surface of the panel guider 100, too. The conductive tapes 200 are also attached to one side surfaces of the bottom cover 170. In this case, the stress-converged portion may correspond to a separable region 101, which is generated by the movement of the LCD panel 110, between the panel guider 100 and the LCD panel 110. As such, the first to third slit trains 201, 202, and 203 are formed on a portion of the conductive tape 200 correspond to the separable region of the LCD device of the narrow bezel model.

The first to third slit trains 201, 202, and 203 are arranged in a pattern that positions of slits in one of the slit trains are shifted from those in adjacent slit trains along the first direction. Preferably, the center axis (Cd) between two adjacent slits in the first slit trains corresponds to the center axis (Cl) of a slit in the second slit trains. These first to third slit trains 201, 202, and 203 can enable the elasticity (or elastic force) of the conductive tapes 200 to be maximized enough to withstand (or resist) a force applied to a direction perpendicular to their longitudinal direction on the surface of the conductive tapes 200. Actually, the first to third slit trains 201, 202, and 203 disperse the stresses caused by the movement of the LCD panel 110, thereby preventing the conductive tapes 200 from peeling off.

More specifically, the first slit train 201 includes a plurality of first slits arranged at a fixed distance in a first direction. The second slit train 202 also includes a plurality of second slits arranged at the fixed distance in the first direction. Similarly, the third slit train 203 includes a plurality of third slits arranged at the first distance in the first direction.

The conductive tape 200 further includes a first rounded slit 205 formed separately at the fixed distance from at least one end of the first to third slit trains 201, 202, and 203. The first rounded slit 205 extends from the end of the first slit train 201 toward a second direction perpendicular to the first direction in which the first to third slit trains 201, 202, and 203 are arranged. Such first rounded slit 205 prevents the conductive tape 200 from being cut off in areas where first to third slit trains 201 to 203 are formed.

In this manner, since the first to third slit trains 201 to 203 formed on the conductive tape 200 can disperse the stresses caused by the movements of the LCD panel 110 which occur in x-x', y-y', and z-z' directions, the conductive tape 200 is very hard to peel off (or detach). Also, the first rounded slit 205 can prevent the conductive tape 200 from being cut off. The structure of such a conductive tape 200 will now be explained in detail referring to FIG. 3.

Figure 3:
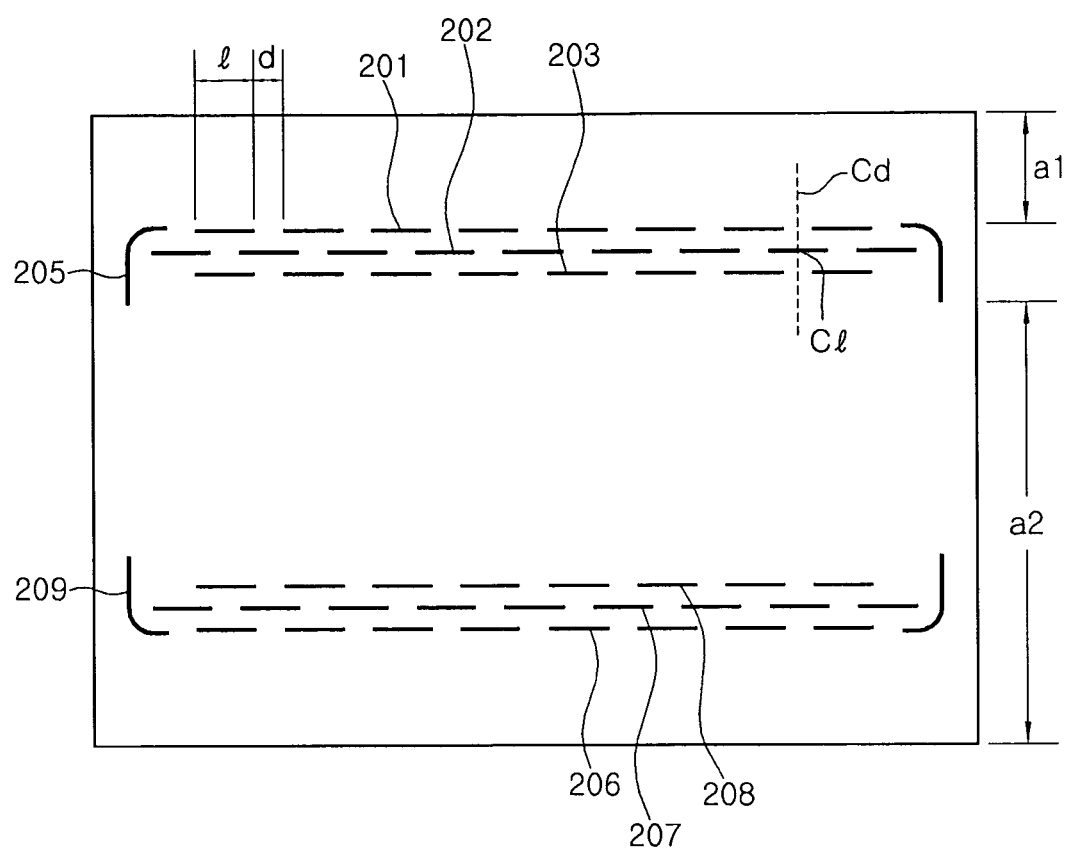
FIG. 3 is a planar view showing in detail the conductive tape shown in FIG. 1.

FIG. 3 is a planar view showing in detail the conductive tape shown in FIG. 1. As shown in FIG. 3, the conductive tape 200 is configured to include a first area portion a1 to be attached to an LCD panel (110 in FIG. 1) along a first direction, and a second area portion a2 to be attached to one side surface of a panel guider (100 in FIG. 1) and optionally the rear surface of a bottom cover (170 in FIG. 1). The conductive tape 200 includes the first to third slit trains 201 to 203 and first rounded slit 205 which are all formed between the first and second area portions a1 and a2. The first to third slit trains 201 to 203 are formed in a pattern (or structure) that positions of slits in one of the slit trains are shifted from those in adjacent slit trains along the first direction, and the first rounded slit 205 is formed at least one end of the first to third slit trains 201 to 203. The portion of the conductive tape 200 in which the first to third slit trains 201 to 203 are formed can correspond to an area where stresses converge (or are concentrated) under the movement of the LCD panel 110.

The first slit train 201 is formed to include a plurality of first slits arranged at a fixed distance in a first direction. The second slit train 202 is also formed to include a plurality of second slits arranged at the same fixed distance in the first direction. Similarly, the third slit train 203 is formed to include a plurality of third slit arranged at the fixed distance in the first direction. The plurality of first to third slits are formed in a pattern (or structure) that positions of slits in one of the slit trains are shifted from those in adjacent slit trains along the first direction.

The length "l" of the first slit 201 and the distance "d" between the adjacent first slits 201 are set up in a ratio of 5:1. For example, if the length of the first slit 201 is 5 mm, the distance to the adjacent first slits 201 can be 1 mm. Also, the length "l" of the second slit 202 and the distance "d" between the adjacent second slits 202 are set up in a ratio of 5:1. In this case, if the length of the second slit 202 is 5 mm, the distance to the adjacent second slits 202 can be 1 mm. Similarly, the length "l" of the third slit 203 and the distance "d" between the adjacent third slits 203 are set up in a ratio of 5:1. Actually, when the length of the first slit 201 is 5 mm, the distance to the adjacent first slits 201 may be 1 mm.

The first rounded slit 205 is formed by being bent from the first direction (i.e., the ends of the first slit train 201) to a second direction perpendicular to the first direction in which the first to third slit trains 201, 202, and 203 are formed. As such, one end portion of the first rounded slit 205 is formed along the first direction, while the other end portion of the first rounded slit 205 is formed along the second direction. Consequently, the first rounded slit 205 has a rounded portion, between its both end portions, which is formed to extend in a curved shape from the first direction toward the second direction.

The conductive tape 200 included in the LCD device of the present embodiment is explained in such a configuration in which the first to third slit trains 201 to 203 are formed, but it is not limited to this. In other words, the LCD device of the present embodiment can include another conductive tape in which a plurality of slit trains including two or four slit trains are formed in a pattern (or structure) that positions of slits in one of the slit trains are shifted from those in adjacent slit trains along the first direction.

In addition, the conductive tape 200 can be configured to further include fourth to sixth slit trains 206 to 208 formed on another area opposite to the area where the first to third slit trains 201 to 203 are formed, and second rounded slit 209 formed at least one end of the fourth to sixth slit trains 206 to 208. The fourth to sixth slit trains 206 to 208 and the second rounded slit 209 prevent an attachment error, such as a reversed attachment of the conductive tape 200, when the conductive tape 200 in which only the first to third slit trains 201 to 203 and the second rounded slit 205 are formed is attached by a worker (or an assembler). Consequently, the fourth to sixth slit trains 206 to 208 and the second rounded slit 209 are additionally formed on the conductive tape 200 so that the worker (or assembler) to easily attach the conductive tapes 200 to the LCD panel 110, the panel guider 100, and the bottom cover 170.

Such first to third slit trains 201 to 203 are formed at a fixed distance in a pattern, that positions of slits in one of the slit trains are shifted from those in adjacent slit trains along the first direction, on the conductive tape 200, thereby dispersing the stresses caused by movements of the LCD panel 110 which occur in x-x', y-y', and z-z' directions. Accordingly, the conductive tape 200 is very hard to peel off (or detach). Also, the first rounded slit 205 is formed at least one end of the first to third slit trains 201 to 203 in a direction perpendicular to the lengthwise direction of the first to third slit trains 201 to 203, in order to prevent the conductive tape 200 from being cut off. As a result, the reliability of the conductive tape 200 can be improved.

As described above, the LCD device according to an embodiment of the present disclosure electrically connects the LCD panel to the bottom cover using a conductive tape, so that static electricity generated in the LCD panel bypasses toward the bottom cover. Therefore, the LCD device can prevent damage or defect due to static electricity, and furthermore can avert the deterioration of display quality.

However, a conductive tape according to the invention is not limited to be adapted in an LCD device, but could be used in any electronic device which generates undesired static electricity. Such an electronic device should have a conductive portion, and at least one conductive tape is attached to the conductive portion to discharge the static electricity.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:
   a liquid crystal display panel;
   a panel guider configured to support edges of the liquid crystal display panel;
   a bottom cover combined with the panel guider; and
   at least one conductive tape attached to the liquid crystal display panel and the bottom cover, and configured to include:
   a plurality of slit trains formed in a pattern, the positions of slits in one of the slit trains are shifted from those in adjacent slit trains along a first direction.

2. The liquid crystal display device claimed as claim 1, wherein a first rounded slit is formed at one end of the plurality of slit trains and extended from the first direction toward a second direction perpendicular to the first direction.

3. The liquid crystal display device claimed as claim 1, wherein the plurality of slit trains are configured to each include a plurality of slits, wherein the length of the slit and the distance between two adjacent slits are set up in a ratio of 5:1.

4. The liquid crystal display device claimed as claim 1, wherein the plurality of slit trains are configured to each include a plurality of slits having a length of 5 mm.

5. The liquid crystal display device claimed as claim 1, wherein the plurality of slit trains are configured to each include a plurality of slits which are formed separately from one another at a distance of 1 mm.

6. The liquid crystal display device claimed as claim 1, wherein the conductive tape configured to include an adhesive coated on its one surface.

7. The liquid crystal display device claimed as claim 1, wherein the conductive tape is configured to further include more slit trains formed on another area opposite to the formation area of the plurality of slit trains.

8. The liquid crystal display device claimed as claim 7, wherein the conductive tape is configured to further include second rounded slits formed at one end of said more slit trains.

9. The liquid crystal display device claimed as claim 1, wherein the conductive tape is also attached to a panel guider.

10. The liquid crystal display device claimed as claim 1, wherein the conductive tape is attached to an edge portion of the surface of the liquid crystal display panel.

11. The liquid crystal display device claimed as claim 1, wherein the plurality of slit trains are formed at a fixed interval.

12. The liquid crystal display device claimed as claim 1, wherein each of the plurality of slit trains comprises a plurality of slits arranged at a fixed distance, and the center axis of the distance between two adjacent slits in one of the plurality of slit trains corresponds to the center axis of the length of a slit in an adjacent slit trains.

13. The liquid crystal display device claimed as claim 1, wherein in a normal-bezel panel, the slit train farthest from the side surface of the panel guider is arranged on a boundary between the liquid crystal display panel and the panel guider.

14. The liquid crystal display device claimed as claim 1, wherein in a narrow-bezel panel, the plurality of slit trains are arranged on a boundary between the top surface of the panel guider and the side surface thereof.

15. A conductive tape used in an electronic device generating static electricity, the electronic device having a conductive portion, the conductive tape being attached to the conductive portion to discharge the static electricity and including:
   a plurality of slit trains formed in a pattern, that positions of slits in one of the slit trains are shifted from those in adjacent slit trains along a first direction.

16. The conductive tape claimed as claim 15, wherein a first rounded slit is formed at one end of the plurality of slit trains and extended from the first direction toward a second direction perpendicular to the first direction.

17. The conductive tape claimed as claim 15, wherein the plurality of slit trains are configured to each include a plurality of slits wherein the length of the slit and the distance between two adjacent slits are set up in a ratio of 5:1.

18. The conductive tape claimed as claim 15, wherein the plurality of slit trains are configured to each include a plurality of slits which are formed in a length of 5 mm.

19. The conductive tape claimed as claim 15, wherein the plurality of slit trains are configured to each include a plurality of slits which are formed separately from one another at a distance of 1 mm.

20. The conductive tape claimed as claim 15, further configured to include an adhesive coated on its one surface.

21. The conductive tape claimed as claim 15, further configured to include more slit trains formed on another area opposite to the formation area of the plurality of slit trains.

22. The conductive tape claimed as claim 21, further configured to include second rounded slits formed at one end of said more slit trains.

23. The conductive tape claimed as claim 15, wherein the plurality of slit trains are formed at a fixed interval.

24. The conductive tape claimed as claim 15, wherein each of the plurality of slit trains comprises a plurality of slits arranged at a fixed distance, and the center axis of the distance between two adjacent slits in one of the plurality of slit trains corresponds to the center axis of the length of a slit in an adjacent slit trains.

* * * * *